US008251431B2

(12) United States Patent
Nakazato

(10) Patent No.: US 8,251,431 B2
(45) Date of Patent: Aug. 28, 2012

(54) OPENING AND CLOSING DEVICE FOR AUTOMOBILE TRUNK LID

(75) Inventor: Kouji Nakazato, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 172 days.

(21) Appl. No.: 12/799,565

(22) Filed: Apr. 27, 2010

(65) Prior Publication Data

US 2010/0275518 A1 Nov. 4, 2010

(30) Foreign Application Priority Data

Apr. 28, 2009 (JP) ................................. 2009-109064

(51) Int. Cl.
*B62D 25/10* (2006.01)

(52) U.S. Cl. ..................................... 296/76; 296/146.11

(58) Field of Classification Search .................... 296/56, 296/76, 146.11
See application file for complete search history.

(56) References Cited

U.S. PATENT DOCUMENTS

| | | | | |
|---|---|---|---|---|
| 5,419,012 | A * | 5/1995 | Lewis | 16/306 |
| 5,584,099 | A * | 12/1996 | Westerdale | 16/245 |
| 5,873,619 | A * | 2/1999 | Lewkoski et al. | 296/76 |
| 6,382,704 | B1 * | 5/2002 | Nastasoiu | 296/146.11 |
| 7,870,643 | B2 * | 1/2011 | Krueger et al. | 16/282 |
| 2002/0096905 | A1 * | 7/2002 | Nicholas et al. | 296/76 |
| 2006/0279105 | A1 * | 12/2006 | Renke et al. | 296/146.11 |
| 2008/0018131 | A1 * | 1/2008 | Heath et al. | 296/76 |
| 2008/0084087 | A1 * | 4/2008 | Duffy | 296/76 |
| 2009/0102225 | A1 * | 4/2009 | Hanna et al. | 296/76 |
| 2009/0282648 | A1 * | 11/2009 | Lee | 16/297 |
| 2010/0109371 | A1 * | 5/2010 | Shoemaker et al. | 296/76 |
| 2010/0180399 | A1 * | 7/2010 | Patzer et al. | 16/54 |

FOREIGN PATENT DOCUMENTS

JP 10-236337 A 9/1998

* cited by examiner

*Primary Examiner* — Jason S Morrow
(74) *Attorney, Agent, or Firm* — Lerner, David, Littenberg, Krumholz & Mentlik, LLP

(57) ABSTRACT

An opening and closing device for an automobile trunk lid is capable of producing an optimum pop-up amount by mounting an elastic spring, which is used to hold a trunk lid in a popped-up state in cooperation with torsion bars when the trunk lid is unlocked, in a link mechanism part that transmits the torsional torque of the torsion bars to the hinge arm of the trunk lid.

2 Claims, 8 Drawing Sheets

OPENING AND CLOSING DEVICE FOR AUTOMOBILE TRUNK LID

BACKGROUND OF THE INVENTION

1. Field of the Invention

The present invention relates to an opening and closing device for an automobile trunk lid, the device adapted to provide a pop-up function at unlocking time for a trunk lid that opens and closes a trunk compartment provided in a vehicle body rear part of an automobile.

2. Description of Related Art

Conventionally, an opening and closing device for an automobile trunk lid having a structure as described below has generally been known.

One end of a hinge arm is fixed to the back surface of the trunk lid, and the other end of the hinge arm is turnably attached to a vehicle body panel in a trunk compartment. The hinge arm has a bent part that is strongly curved downward so as not to interfere with the vehicle body panel when the trunk lid is opened upward. One end of a hinge link is pivotally supported on an intermediate portion of the bent part of the hinge arm, and a receiving part is provided at the other end of the hinge link. On the other hand, in the trunk compartment, two torsion bars are disposed in the vehicle width direction, and crank parts provided on the torsion bars are disposed so as to engage with the receiving parts of the right and left hinge links (for relevant conventional art, refer to JP 10-236337 A).

As described above, the hinge arm and the crank part of the torsion bar are connected to each other via the hinge link. Therefore, by closing the trunk lid from an opened state, the torsion bar is twisted, and thereby the torsional torque is transmitted from the crank part to the hinge link and the hinge arm as a spring action, so that a restoring force in the opening direction is imparted to the trunk lid. Thus, action for lifting the trunk lid by utilizing this restoring force when the trunk lid is unlocked, that is, a so-called "pop-up function" is provided. Thereby, the user can judge the opening and closing state of the lid at a glance.

SUMMARY OF THE INVENTION

In a vehicle in which the torsional torque of the torsion bar is used as a power source for opening and closing the trunk lid as described above, a proper pop-up amount can be obtained by designing the link part shape of the hinge mechanism part of the trunk lid and the output of the torsion bar. However, the design must be made considering many factors such as the occupied space of the link mechanism part, the weight of the trunk lid, and variations in torsional torque of the torsion bar, so that it has been difficult to determine an ideal pop-up amount (about 50 mm or about 5 degrees of trunk opening angle). Above all, the design has required enormous time and labor.

FIG. 13 shows conventional torque setting of torque around a pin for pivotally supporting the hinge arm on a hinge bracket due to the torsion bar (● line) and torque on account of the weight of the trunk itself (▲ line). Conventionally, since the torque in the direction of popping up and opening the trunk lid has been set by the spring of the torsion bar only, delicate setting such that the torque lines intersect with each other two times while approaching each other has been required, and it has been necessary to tightly control the tolerance of the link member and the reaction tolerance of the torsion bar. Also, if the torque is set so that popping-up is performed reliably in the above-described delicate setting, it is necessary to make the set pop-up angle as large as about 20 degrees. The setting of the pop-up angle at 5 degrees, which is the pop-up angle required for improving the sense of high quality and the appearance, requires tighter quality control.

Accordingly, an object of the present invention is to provide an opening and closing device for an automobile trunk lid that is capable of obtaining an optimum pop-up amount by mounting an elastic springing means, which is used to hold a trunk lid in a popped-up state in cooperation with the torsion bars when the trunk lid is unlocked, in a link mechanism part that transmits the torsional torque of the torsion bars to the hinge arm of the trunk lid.

To attain the above object, the present invention provides an opening and closing device for an automobile trunk lid, comprising: a hinge arm, the hinge arm having one end and having another end, the one end fixed to the trunk lid and the other end turnably attached to the side of vehicle body panel; a hinge link, the hinge link having one end and having another end, the one end turnably attached to an intermediate portion of the hinge arm; a torsion bar that imparts a torsional torque to the other end of the hinge link, the torsional torque imparting a restoring force in the open direction to the trunk lid; and an elastic springing means mounted in the hinge link, the elastic springing means being elastically deformed when the trunk lid is locked and holding the trunk lid in a popped-up state by means of a restoring force when the trunk lid is unlocked, wherein the elastic springing means is provided at a position at which an elastic force is imparted to between the hinge arm and the hinge link so as to respond to the opening of the trunk lid when the trunk lid is fully opened.

In the present invention, a pop-up spring is used as the elastic springing means, the pop-up spring having a reversing part reversed by folding an intermediate portion, a supporting part attached to the side of hinge link at one end part thereof, and an arcuate curved part at the other end part thereof.

Also, in the present invention, the supporting part of the pop-up spring is rotatably mounted coaxially with a rotating shaft by which the hinge link is turnably mounted in an intermediate portion of the hinge arm.

Furthermore, in the present invention, the opening and closing device is configured so that when the trunk lid is locked, the reversing part of the pop-up spring is brought into contact with the hinge arm and is elastically deformed, and when the trunk lid is unlocked, the trunk lid is held in a popped-up state by the restoring force of the pop-up spring together with the restoring force of the torsion bar, and is also configured so that when the trunk lid is fully opened, the reversing part of the pop-up spring is located in a region held between the hinge arm and the hinge link, and the reversing part of the pop-up spring comes into contact with the hinge arm and the hinge link, whereby an elastic force is imparted to between the hinge arm and the hinge link.

According to the present invention, since the elastic springing means that holds the trunk lid in a pop-up state when the trunk lid is unlocked is mounted on the hinge link, the trunk lid can be held in an optimum pop-up state that is not affected by the shape and size of the link mechanism part and is also not affected by the variations in performance of the torsion bar. Also, since the trunk lid is held in a pop-up state by the torsion bar and the elastic springing means in cooperation, the opening and closing device is less liable to be influenced by variations in performance of the torsion bar, so that the design labor can be reduced. Furthermore, since the elastic springing means is provided at the position at which an elastic force is imparted to between the hinge arm and the hinge link so as to respond to the opening of the trunk lid when the trunk lid is fully opened, the opening and closing device has an effect of reducing the speed at which the trunk lid opens is reduced and decreasing the vibrations caused by rebounding at the time when the trunk lid is fully opened.

Furthermore, in the present invention, as the elastic springing means, the pop-up spring is used that has the reversing part reversed by folding an intermediate portion, and also is provided with the base part attached to the side of hinge link part in one end part thereof and is provided with the arcuate curved part in the other end part thereof. Therefore, the trunk lid can be held in a popped-up state by the restoring force of the pop-up spring, and also since the parts of the pop-up spring are small, the trunk compartment capacity is not affected, and the assembly work is easy to perform.

Still further, since the base part is rotatably mounted coaxially with the rotating shaft by which the hinge link is turnably mounted in an intermediate portion of the hinge arm, the occupied space of the link mechanism part can be reduced.

Also, the opening and closing device is configured so that when the trunk lid is locked, the reversing part of the pop-up spring is brought into contact with the hinge arm and is elastically deformed, and when the trunk lid is unlocked, the trunk lid is held in a pop-up state by the restoring force of the pop-up spring together with the restoring force of the torsion bar, and is also configured so that when the trunk lid is fully opened, the reversing part of the pop-up spring is located in a region held between the hinge arm and the hinge link, and the reversing part of the pop-up spring comes into contact with the hinge arm and the hinge link, whereby an elastic force is imparted to between the hinge arm and the hinge link. Therefore, since the parts of the pop-up spring are small, the trunk compartment capacity is not affected, and the assembly work is easy to perform.

DETAILED DESCRIPTION OF PREFERRED EMBODIMENTS

First Embodiment

Figure 1:
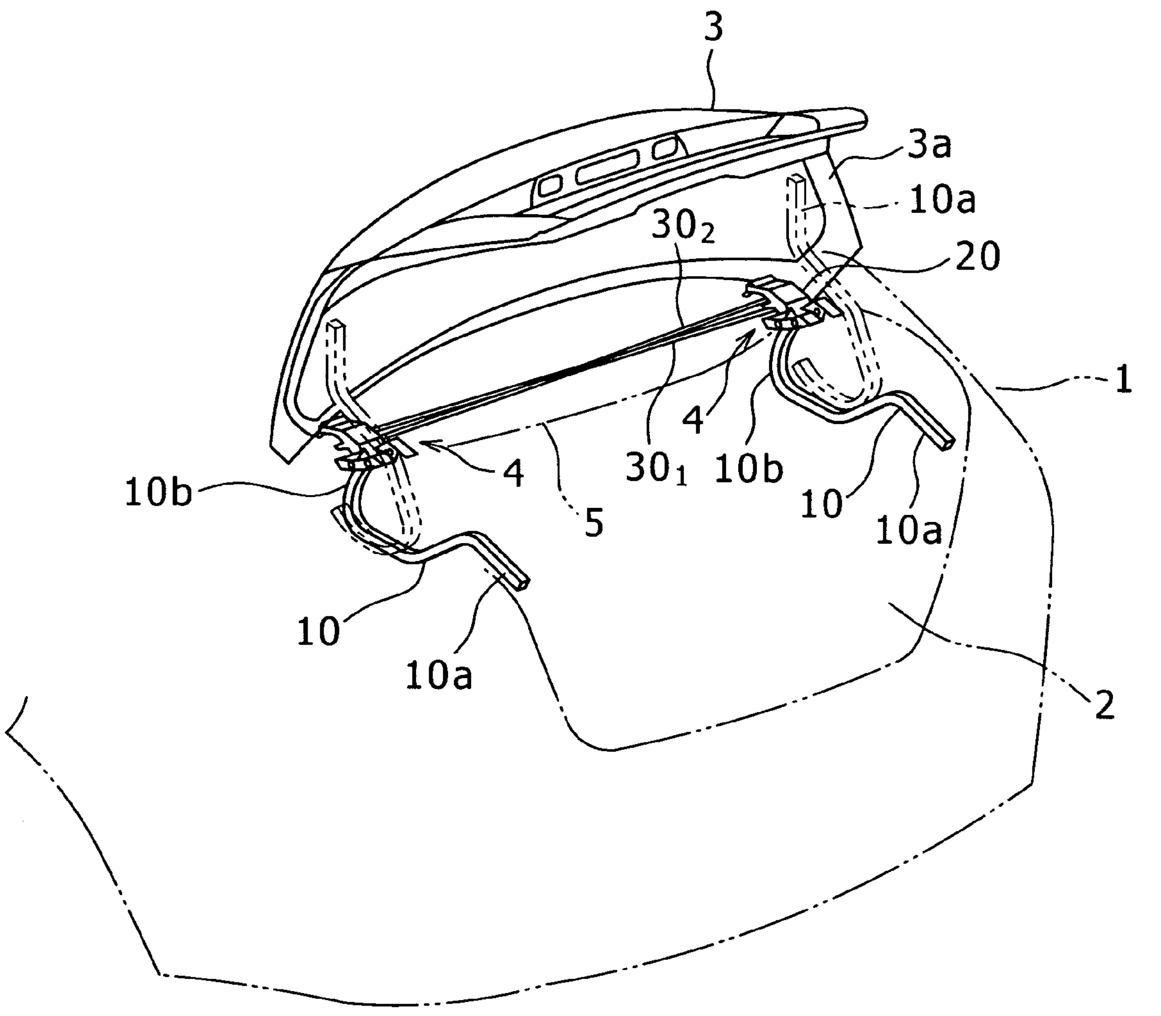
FIG. 1 is a perspective view of an opening and closing device for an automobile trunk lid in accordance with an embodiment of the present invention.
Figure 2:
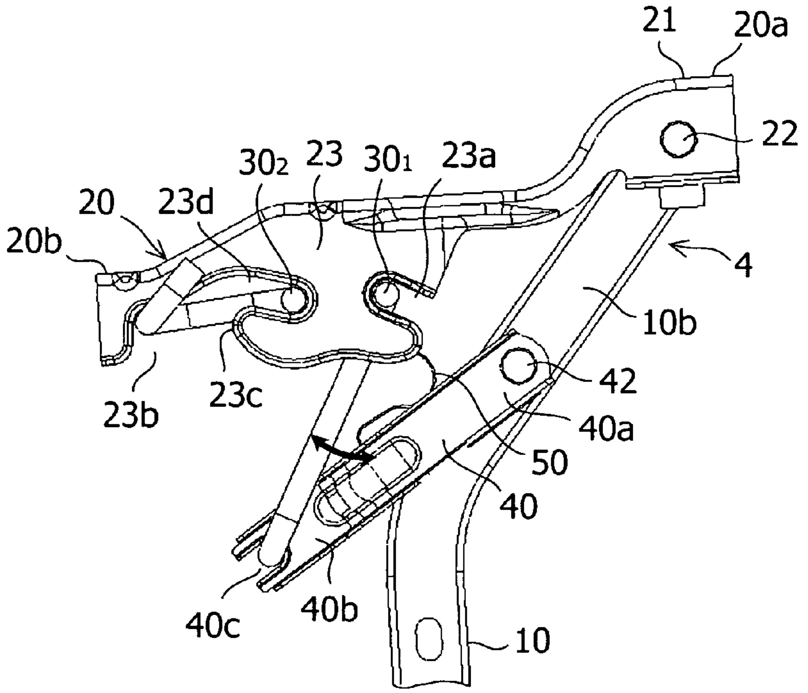
FIG. 2 is a side view of an opening and closing device for an automobile trunk lid in accordance with an embodiment of the present invention, showing a state in which the trunk lid is closed.
Figure 3:
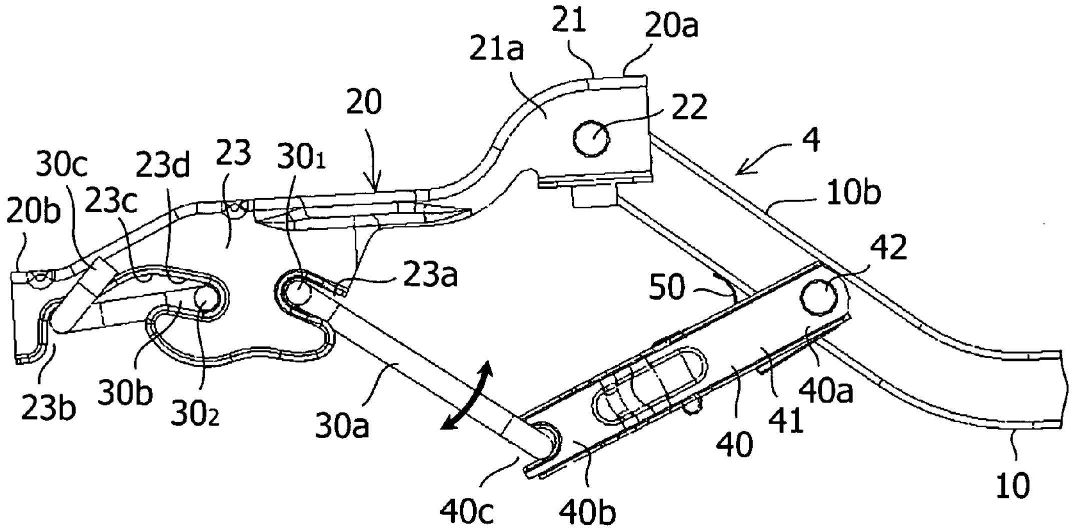
FIG. 3 is a side view of an opening and closing device for an automobile trunk lid in accordance with an embodiment of the present invention, showing a state in which the trunk lid is open.

An embodiment of an opening and closing device for an automobile trunk lid will now be described in detail with reference to the accompanying drawings.

In FIGS. 1 to 4, a vehicle body 1 of an automobile is provided with a trunk compartment 2 divided from a passenger compartment, and the trunk compartment 2 is provided with a trunk lid 3 that is opened and closed freely.

The trunk lid 3 is provided with a link mechanism part 4 between the trunk lid 3 and the interior of the trunk compartment 2, and the trunk lid 3 is mounted so as to be opened and closed freely by the link mechanism part 4.

The link mechanism part 4 is made up of right and left hinge arms (trunk hinges) 10 one end part 10*a* of which is attached to an inner panel 3*a* of the trunk lid 3, right and left hinge brackets 20 mounted on a vehicle body panel 5 such as a partition panel in the trunk compartment 2 and each turnably supporting the other end part 10*b* of the hinge arm 10, a pair of torsion bars $\mathbf{30}_1$ and $\mathbf{30}_2$ set between the right and left hinge brackets 20, and hinge links 40 provided between the torsion bars $\mathbf{30}_1$ and $\mathbf{30}_2$ and the hinge arms 10.

Each of the right and left hinge arms 10 is formed so as to be curved substantially in a U shape, and one end part 10*a* thereof is fixed to the inner panel 3*a* of the trunk lid 3, and the other end part 10*b* thereof is turnably supported on one end part 20*a* of the hinge bracket 20. The hinge bracket 20 is configured so that the one end part 20*a* on the vehicle body rear side is provided with an inverse U-shaped part 21 directed to the outside of the trunk compartment 2, and a pin hole 21*b* is formed in both-side side walls 21*a* of the inverse U-shaped part 21. The other end part 10*b* of the hinge arm 10 is assembled to between the both-side side walls 21*a*, and a pin 22 is inserted through the pin hole 21*b*, whereby the other end part 10*b* of the hinge arm 10 is supported rotatably. The hinge bracket 20 has a pair of right and left side wall parts 23 directed to the lower side on the other end part 20*b* side on the opposite side to the inverse U-shaped part 21, and a slit part 23*a* directed to the vehicle body front is provided at the rear end of the side wall part 23. In the side wall part 23, a notch part 23*c* having an opening 23*b* is provided on the lower end part side, and a slit part 23*d* directed to the slit part 23*a* side is provided in the rear edge part on the inner surface side of the notch part 23*c*.

Figure 4:
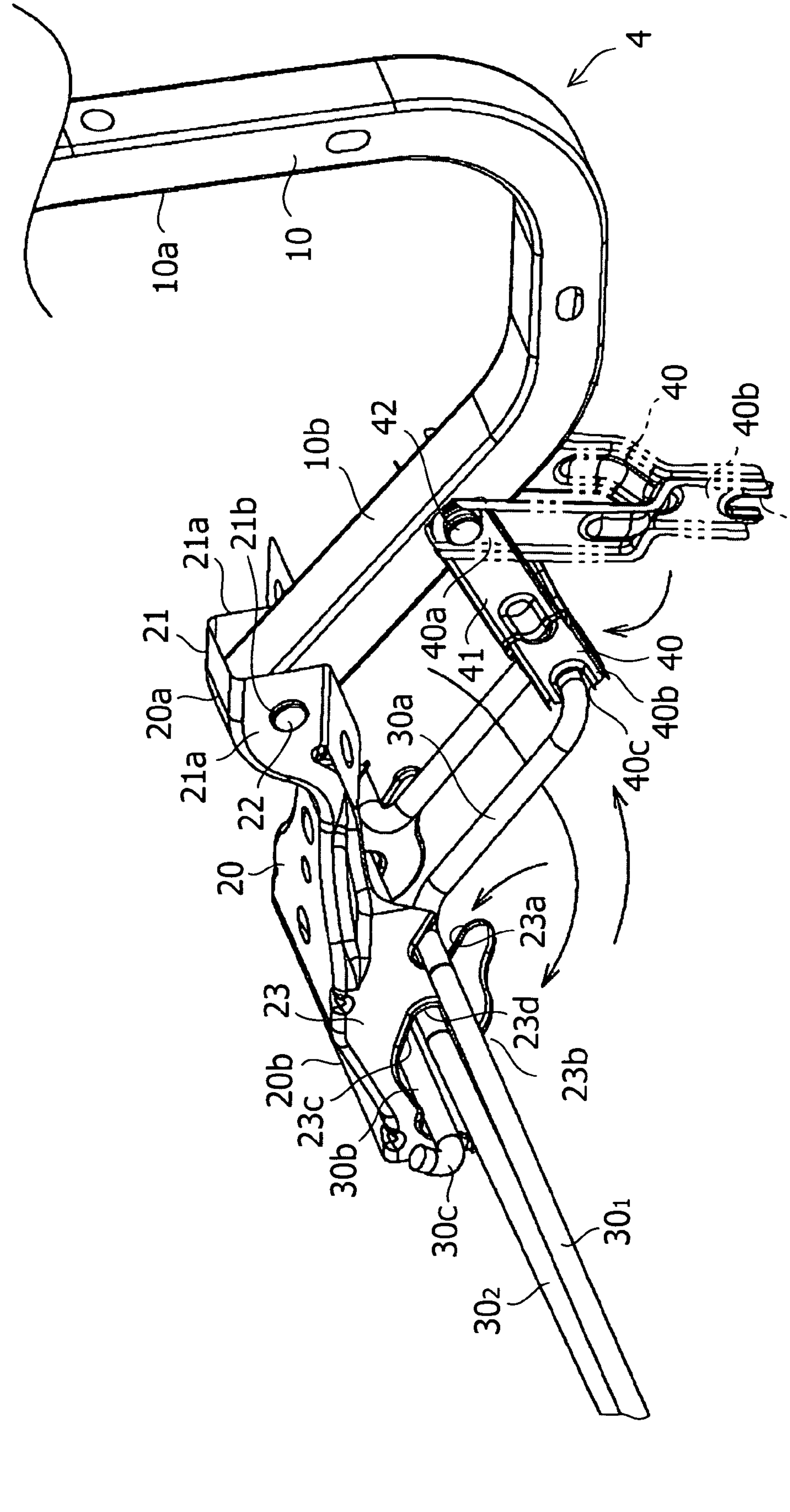
FIG. 4 is a perspective view of a link mechanism for the opening and closing device for an automobile trunk lid shown in FIG. 1.

The two torsion bars $\mathbf{30}_1$ and $\mathbf{30}_2$ are arranged in symmetry with each other. One end part thereof is formed with a substantially inverse U-shaped crank part 30*a*, and the other end part is formed with a folded part 30*b* engagingly fixed to the notch part 23*c* of the side wall part 23 of the hinge bracket 20. FIG. 4 shows one end part of the torsion bar $\mathbf{30}_1$ and the other end part of the torsion bar $\mathbf{30}_2$.

The torsion bars $\mathbf{30}_1$ and $\mathbf{30}_2$ are fixed so that the both sides of the crank part 30*a* on one end part side are supported by being engaged with the slit part 23*a* of the both-side wall part 23, and the folded part 30*b* is engaged with the notch part 23*c* of the side wall part 23. At the tip end of the folded part 30*b*, a bent part 30*c* is provided, and the bent part 30*c* is engaged with the wall surface of the side wall part 23 to prevent the torsion bars $\mathbf{30}_1$ and $\mathbf{30}_2$ from coming off.

Figure 5:
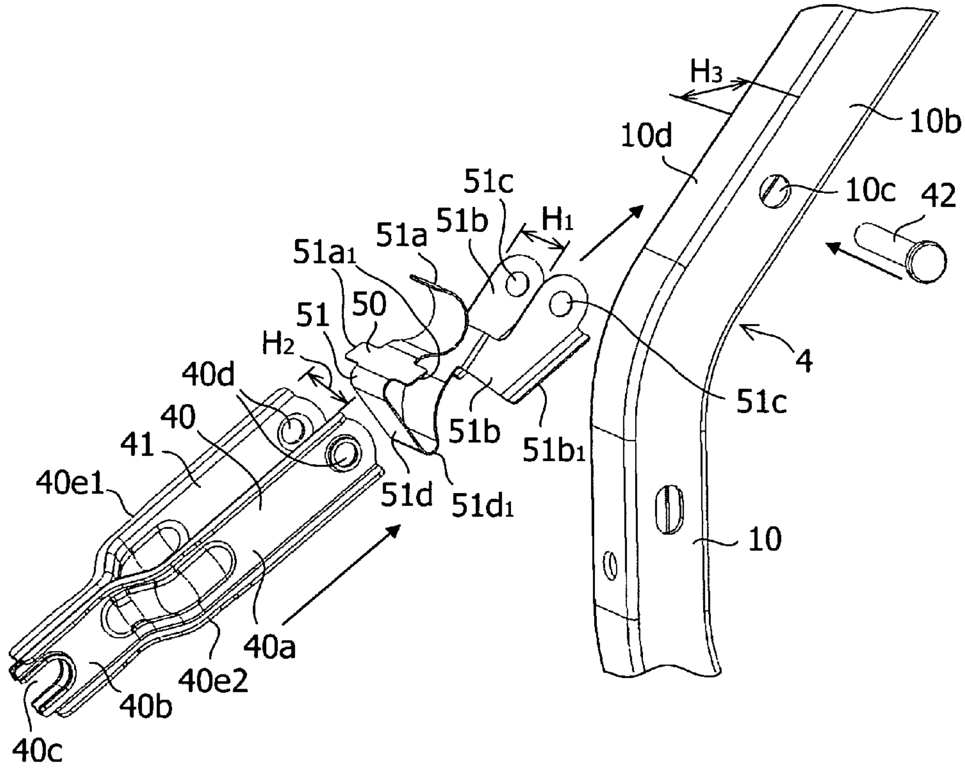
FIG. 5 is a perspective view showing a method for assembling a pop-up spring shown in FIG. 2.
Figure 6:
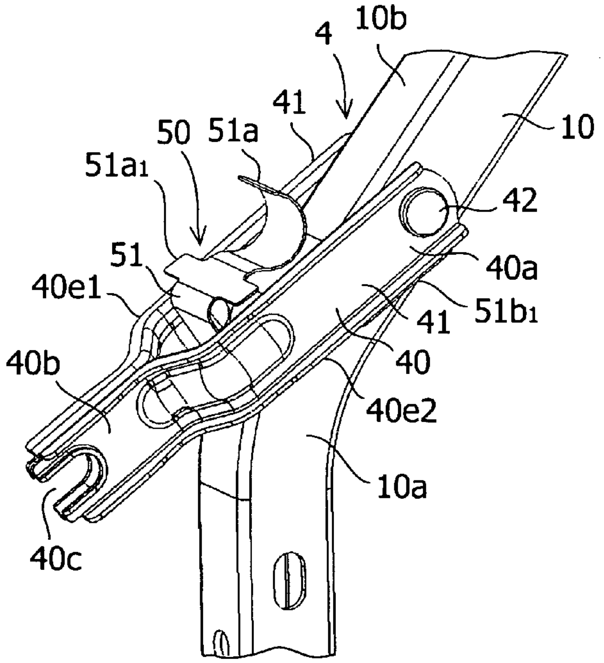
FIG. 6 is a perspective view showing a state in which a pop-up spring shown in FIG. 2 has been assembled.

The hinge link 40 is configured so that one end part 40*a* thereof is pivotally supported on an intermediate portion on the other end part 10*b* side of the hinge arm 10, and the other end part 40*b* thereof is engaged with the crank part 30*a* of the torsion bar $\mathbf{30}_1$, $\mathbf{30}_2$. As shown in FIGS. 5 and 6, the hinge link 40 is formed by two plates or by folding one plate in two. For the hinge link 40, mounting holes 40*d* facing to each other are formed in a pair of plates 41 on the one end part 40*a* side facing to each other with a fixed space being provided therebetween. The mounting holes 40*d* are lapped on mounting holes 10*c* in the vehicle width direction formed in both side surfaces of the other end part 10*b* of the hinge arm 10 and are fixed to the mounting holes 10*c* via a pin 42, so that the hinge link 40 is pivotally supported on the hinge arm 10 so as to be rotatable. Also, the hinge link 40 is formed with a U-shaped receiving part 40*c* extending from the end face toward the lengthwise direction in the paired plate 41 end parts lapped on each other on the other end part 40*b* side, and the crank part 30*a* of the one torsion bar $\mathbf{30}_1$ (or $\mathbf{30}_2$) is engagingly supported by the receiving part 40*c*.

As shown in FIGS. 5 and 6, to the hinge link 40, there is assembled a pop-up spring 50 serving as an elastic springing means for holding the trunk lid 3 in a pop-up state when the trunk lid 3 is unlocked. The pop-up spring 50 is configured so that a curved part 51*a* of a semicircular shape directed to the outside is formed in one end part of a band-like plate spring 51 reversed by folding an intermediate portion, and a pair of supporting parts 51*b* facing to each other in the vehicle width direction are provided in the other end part of the plate spring 51. The curved part 51*a* and the supporting parts 51*b* are formed extending so as to be directed to directions opposite to each other.

The width $H_1$ of the band-like plate spring 51 is made narrower than the width $H_2$ between the paired plates 41 on the one end part 40*a* side, and the width $H_3$ between the paired supporting parts 51*b* is also made smaller than the width $H_2$ between the paired plates 41.

Each of the paired supporting parts 51*b* is formed with a flange part $\mathbf{51}b_1$ serving as a base part extending so as to be directed to the outside on one side thereof. On the other hand, in a proximal end part of the curved part 51*a*, stopper pieces $\mathbf{51}a_1$, extending so as to be directed to the outside in the vehicle width direction, are formed. The flange parts $\mathbf{51}b_1$ and the stopper pieces $\mathbf{51}a_1$ are assembled so as to hold both end faces 40*e*1 and 40*e*2 in the vehicle body longitudinal direction of the hinge link 40.

The flange parts $\mathbf{51}b_1$ and the stopper pieces $\mathbf{51}a_1$ are arranged in parallel with each other with a fixed space being provided therebetween, and are formed so as to engage with both the end faces 40*e*1 and 40*e*2 in the thickness direction of the hinge arm 10. Mounting holes 51*c* coinciding with the mounting holes 10*c* are formed at the corresponding positions of the paired supporting parts 51*b*. The mounting holes 51*c* are pivotally supported rotatably by the pin 42 so as to coincide with the mounting holes 10*c* in the hinge arm 10 and the mounting holes 40 in the hinge link 40, whereby the hinge link 40 and the pop-up spring 50 are supported on the hinge arm 10. A reversing part 51*d* of the pop-up spring 50, in which the intermediate portion is folded, is provided with a protruding part 51*e* extending in the same direction as that of the paired supporting parts 51*b*.

The operation of the opening and closing device for an automobile trunk lid configured as described above is explained with reference to FIGS. 7 to 12.

Figure 7:
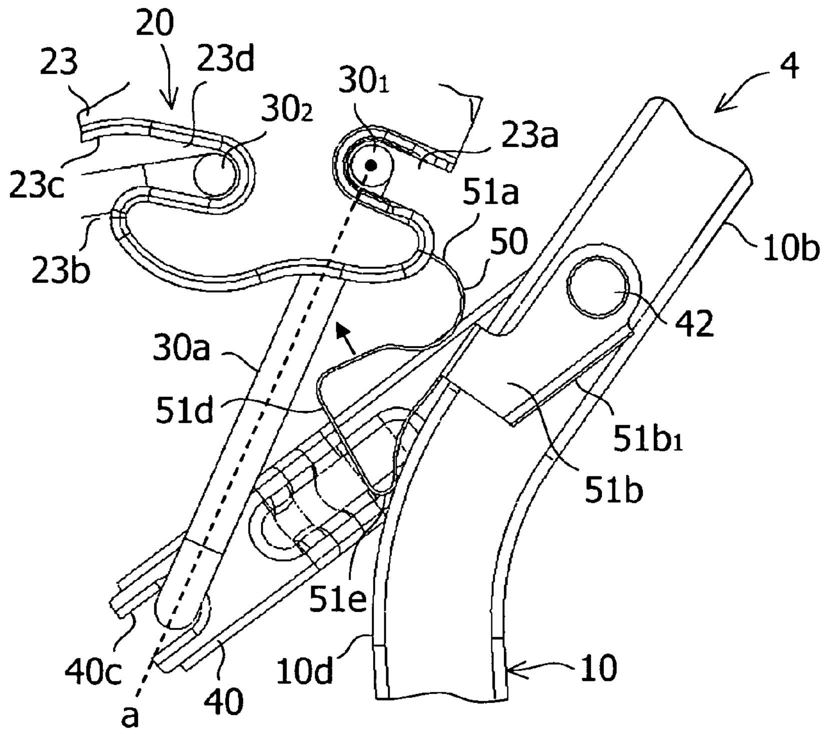
FIG. 7 is a side view showing the operation of a pop-up spring shown in FIG. 2 in a state in which a trunk lid is closed.

FIG. 7 shows the link mechanism part 4 in the state in which the trunk lid 3 is closed. With the turning of the hinge arm 10, the protruding part 51*e* of the pop-up spring 50 comes into contact with an end face 10*d* of the other end part 10*b* of the hinge arm 10, and it is pushed out as indicated by the arrow mark in FIG. 7, so that a force that pushes out the hinge arm 10 acts always. At this time, on the trunk lid 3, the spring action of the pop-up spring 50 is produced together with the spring action of the torsion bars $\mathbf{30}_1$ and $\mathbf{30}_2$, so that a force in the direction such as to open the trunk lid 3 acts.

Figure 8:
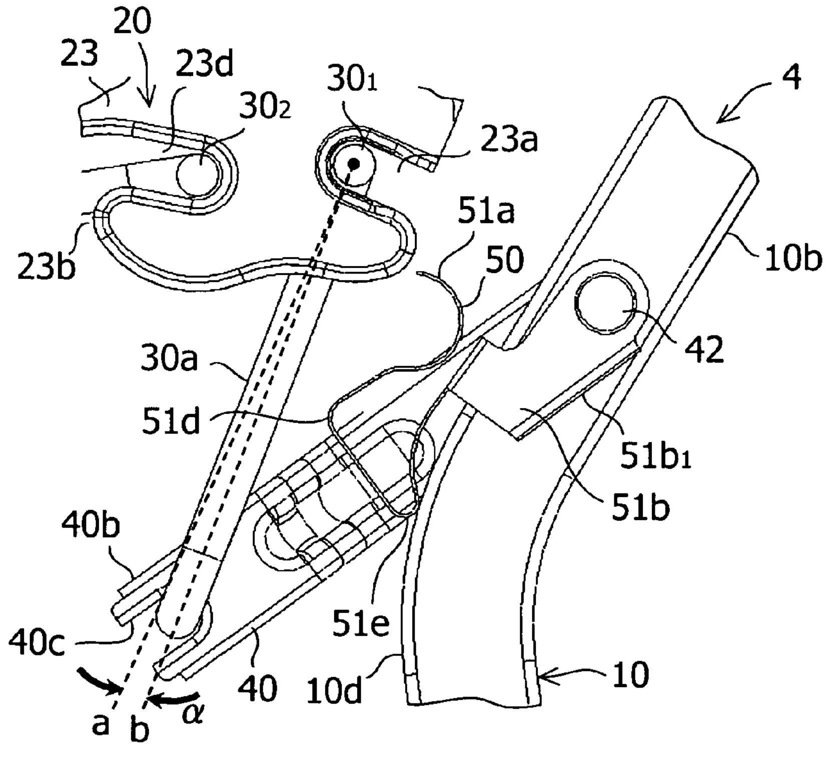
FIG. 8 is a side view showing the operation of the pop-up spring shown in FIG. 7 in a state in which a trunk lid is unlocked.

FIG. 8 shows the link mechanism part 4 in the state in which the trunk lid 3 is unlocked. The trunk lid 3 is made in a popped up state by the spring action of the pop-up spring 50 together with the spring action of the torsion bars $\mathbf{30}_1$ and $\mathbf{30}_2$. Thus, the pop-up spring 50 returns to the natural state.

Regarding the crank part 30*a* of the torsion bar $\mathbf{30}_1$, $\mathbf{30}_2$ at this time, the change from position a in FIG. 7 to position b in FIG. 8 is a pop-up angle $\alpha$.

Figure 9:
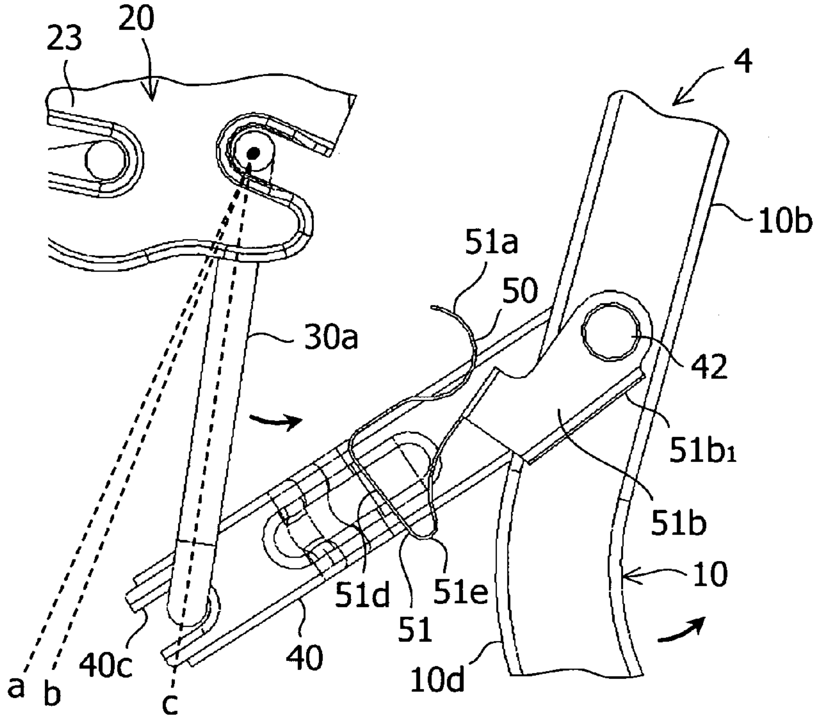
FIG. 9 is a side view showing the operation of the pop-up spring shown in FIG. 8 in a state in which a trunk lid is open.

FIG. 9 shows the link mechanism part 4 in an intermediate state during the time when the trunk lid 3 is being opened after the trunk lid 3 has been unlocked. The hinge arm 10 turns together with the trunk lid 3, and the hinge link 40 separates gradually from the hinge arm 10. At this time, since the crank part 30*a* of the torsion bar $\mathbf{30}_1$, $\mathbf{30}_2$ engages with the receiving part 40*c* of the hinge link 40, the crank part 30*a* turns with the turning of the hinge link 40, and moves to position c. Thus, the protruding part 51*e* of the pop-up spring 50 separates from the hinge arm 10, and the flange parts $\mathbf{51}b_1$ of the pop-up spring 50 separate from contact with the end face 10*d* of the hinge arm 10.

Figure 10:
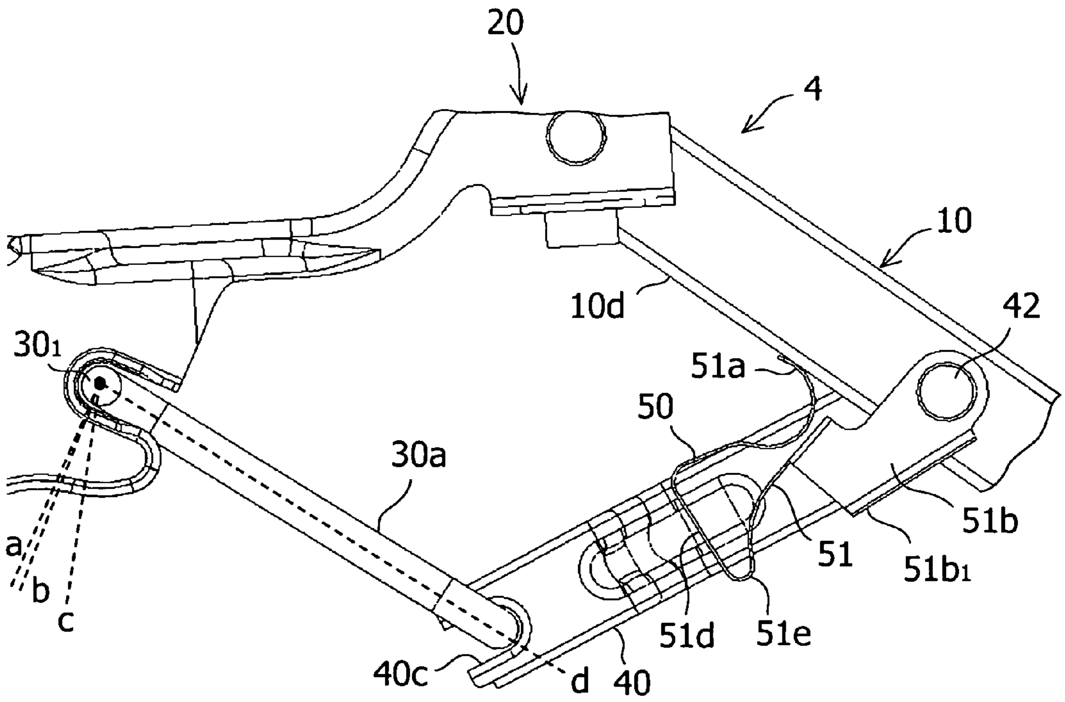
FIG. 10 is a side view showing the operation of the pop-up spring shown in FIG. 9 in a state in which a trunk lid is fully opened.

FIG. 10 shows the link mechanism part 4 in the state in which the trunk lid is open. With the turning of the hinge arm 10, the hinge arm 40 turns greatly and opens, and the crank part 30*a* of the torsion bar $\mathbf{30}_1$, $\mathbf{30}_2$ also moves and turns greatly. At this time, the curved part 51*a* of the pop-up spring 50 comes into contact with the end face 10*d* of the hinge arm 10 and is compressed to produce the spring action, so that the speed at which the trunk lid 3 opens is reduced. Also, since the elastic force of the curved part 51*a* of the pop-up spring 50 acts between the hinge arm 10 of the trunk lid 3 and the hinge link 40, vibrations caused by rebounding at the time when the trunk lid 3 is fully opened is reduced.

Figure 11:
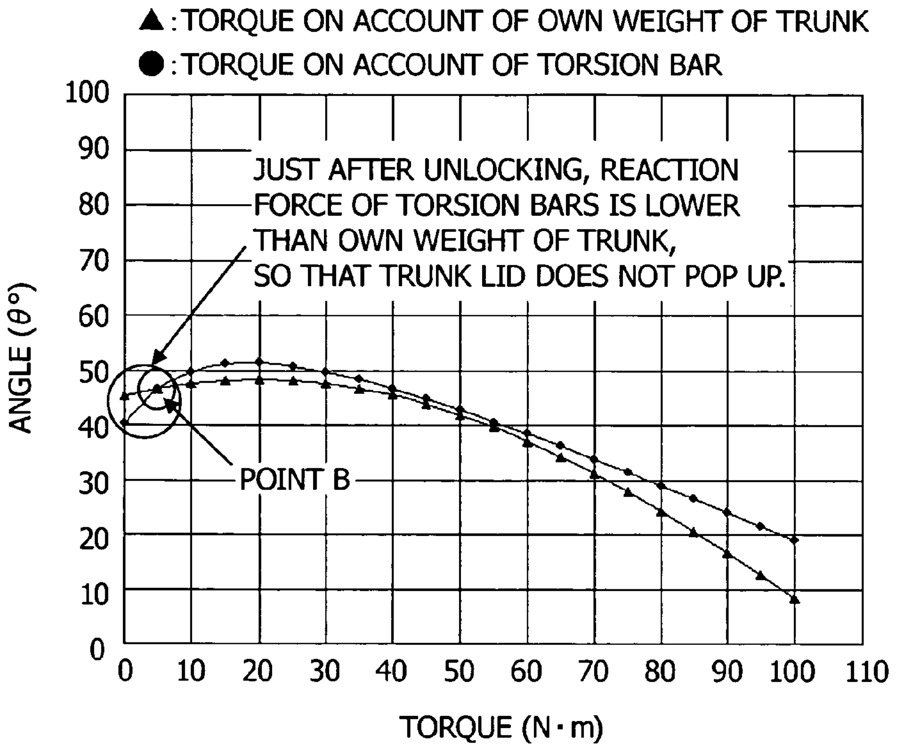
FIG. 11 is a graph showing the relationship between rotational torque around a pin due to a torsion bar in accordance with the present invention (● line) and torque due to the weight of the trunk itself (▲ line)

In the torque setting of rotational torque around the pin 22, which pivotally supports the hinge arm 10 on the hinge bracket 20, due to the torsion bar $\mathbf{30}_1$, $\mathbf{30}_2$ (● line) and torque due to the weight of the trunk itself (▲ line) in the present invention shown in FIG. 11, the intersection of the torque lines is set at only one point of 5 degrees of the pop-up angle, and at angles not smaller than 5 degrees, the rotational torque around the pin 22 is always higher than the torque due to the weight of the trunk itself, so that torque can be imparted in the direction such that the trunk opens.

Figure 12:
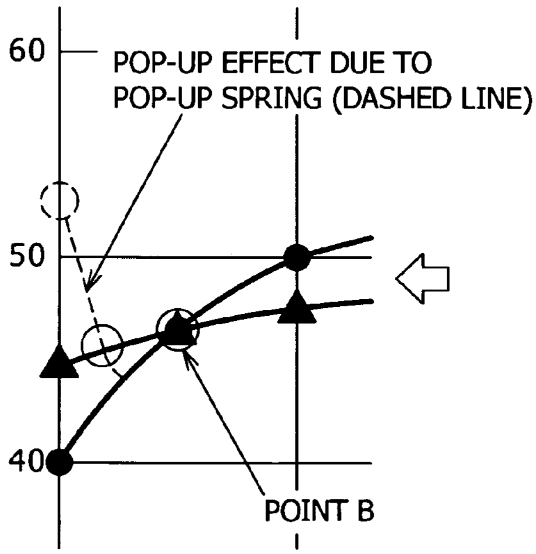
FIG. 12 is a graph showing a pop-up effect due to a pop-up spring.
Figure 13:
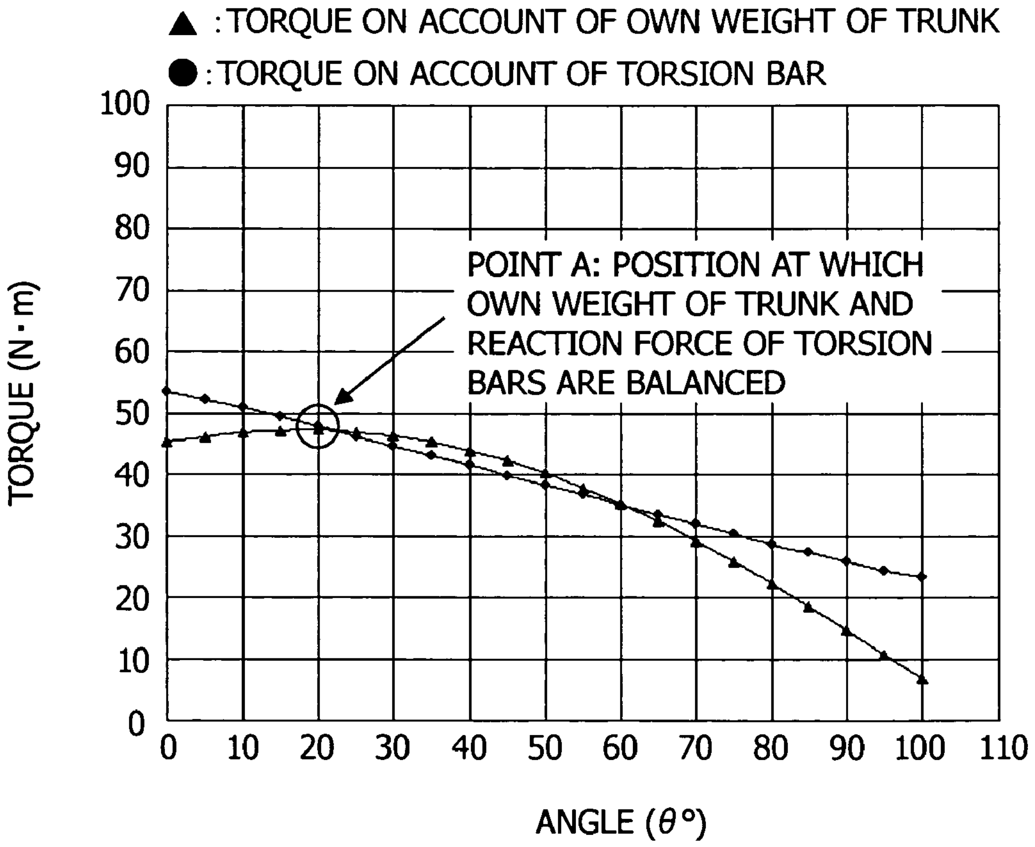
FIG.13 (RELATED ART)
FIG. 13 is a graph showing the relationship between rotational torque around a pin due to a conventional torsion bar (● line) and torque due to the weight of the trunk itself (▲ line).

At angles not larger than 5 degrees, the pop-up spring of the present invention pushes up the trunk to realize 5 degrees of the pop-up angle as shown in FIG. 12.

Also, just before the trunk lid 3 is fully opened, the speed at which the trunk lid 3 opens can be reduced by the pop-up spring.

Therefore, the rotational torque around the pin 22 due to the torsion bar $\mathbf{30}_1$, $\mathbf{30}_2$ can be set easily, and the tolerance of the link member and the reaction tolerance of the torsion bar $\mathbf{30}_1$, $\mathbf{30}_2$ can be controlled with ease, so that the opening and closing device is advantageous in terms of productivity and cost.

According to the above-described embodiment, the pop-up spring 50 serving as the elastic springing means for holding the trunk lid 3 in a pop-up state when the trunk lid 3 is unlocked is mounted to the hinge link 40. Therefore, the trunk lid 3 can be held in an optimum pop-up state that is not affected by the shape and size of the link mechanism part 4 and is also not affected by variations in performance of the torsion bar. Also, since the trunk lid 3 is held in a pop-up state by the torsion bar $\mathbf{30}_1$, $\mathbf{30}_2$ and the pop-up spring 50 in cooperation, the opening and closing device is less liable to be influenced by the variations in performance of the torsion bar $\mathbf{30}_1$, $\mathbf{30}_2$, so that the design labor can be reduced.

Also, since the curved part 51_a_ of the pop-up spring 50 is provided at a position at which a springing force is imparted to between the hinge arm 10 and the hinge link 40 so as to respond to the opening of the trunk lid 3 when the trunk lid 3 is fully opened, the opening and closing device of the present invention has an effect of reducing the speed at which the trunk lid 3 opens and decreasing the vibrations caused by rebounding at the time when the trunk lid 3 is fully opened.

Furthermore, the pop-up spring 50 has the reversing part 51_d_ in which the intermediate portion is folded, and is configured so that the flange parts $\mathbf{51}b_1$ attached to the hinge link 40_s_ side are provided in one end part thereof, and the arcuate curved part 51_a_ is provided in the other end part thereof, and also the reversing part 51_d_ is provided with the protruding part 51_e_ extending in the same direction as that of the paired supporting parts 51_b_. Therefore, when the trunk lid 3 is locked, the protruding part 51_e_ of the reversing part 51_d_ of the pop-up spring 50 is brought into contact with the hinge arm 10 to elastically deform the reversing part 51_d_, and when the trunk lid 3 is unlocked, the trunk lid 3 can be held in a pop-up state by the restoring force of the reversing part 51_d_ of the pop-up spring 50 together with the restoring force of the torsion bars $\mathbf{30}_1$ and $\mathbf{30}_2$. Since the parts of the pop-up spring 50 are small, the trunk compartment capacity is not affected, and the assembly work is easy to perform.

The present invention is not limited to the above-described embodiment. For example, the pop-up spring 50 may be of any shape as long as it can produce spring action by being attached to the hinge link 40 and can be brought into contact with the end face 10_d_ of the hinge arm 10. In particular, the band-like plate spring 51 is bent to form the curved part 51_a_, the reversing part 51_d_, the protruding part 51_e_, and the flange parts $\mathbf{51}b_1$. However, the pop-up spring 50 may be of any shape. Of course the present invention can be carried out by being modified and changed appropriately within the scope in which the gist of the present invention is not changed.

What is claimed is:

1. An opening and closing device for an automobile trunk lid, comprising:

a trunk lid mounted so as to be opened and closed freely on a trunk compartment and having a mechanism for locking the opening of the trunk lid when the trunk compartment is closed, the truck compartment being mounted in a vehicle body;

a hinge arm, the hinge arm having one end and having another end, the one end fixed to the trunk lid and the other end turnably attached to the side of vehicle body panel;

a hinge link, the hinge link having one end and having another end, the one end turnably attached to an intermediate portion of the hinge arm;

a torsion bar that imparts a torsional torque to the other end of the hinge link, the torsional torque imparting a restoring force in the open direction to the trunk lid; and an elastic springing means mounted in the hinge link, the elastic springing means being elastically deformed when the trunk lid is locked and holding the trunk lid in a popped-up state by means of a restoring force when the trunk lid is unlocked, wherein a pop-up spring is used as the elastic springing means, the pop-up spring having a reversing part reversed by folding an intermediate portion, a supporting part attached to the side of the hinge link at one end part thereof, and an arcuate curved part at the other end part thereof; and wherein the opening and closing device is configured so that when the trunk lid is locked, the reversing part of the pop-up spring is brought into contact with the hinge arm and is elastically deformed, and when the trunk lid is unlocked, the trunk lid is held in a popped-up state by the restoring force of the pop-up spring together with the restoring force of the torsion bar, and is also configured so that when the trunk lid is fully opened, the reversing part of the pop-up spring is located in a region held between the hinge arm and the hinge link, and the reversing part of the pop-up spring comes into contact with the hinge arm and the hinge link, whereby an elastic force is imparted to between the hinge arm and the hinge link.

2. The opening and closing device for an automobile trunk lid according to claim 1, wherein the supporting part of the pop-up spring is rotatably mounted coaxially with a rotating shaft by which the hinge link is turnably mounted in an intermediate portion of the hinge arm.

* * * * *

UNITED STATES PATENT AND TRADEMARK OFFICE

CERTIFICATE OF CORRECTION

PATENT NO. : 8,251,431 B2
APPLICATION NO. : 12/799565
DATED : August 28, 2012
INVENTOR(S) : Nakazato It is certified that error appears in the above-identified patent and that said Letters Patent is hereby corrected as shown below:

In the Specification

Col. 2, Line 67, "opens" should read -- opening --.

Col. 4, Line 43, after "to" and before "between," insert -- be --.

Col. 7, Line 12, before "between," delete "to".

In the Claim

Claim 1, Col. 8, Line 11, after "of" and before "vehicle," insert -- the --.

Signed and Sealed this
Twenty-fourth Day of December, 2013

Margaret A. Focarino

Margaret A. Focarino
*Commissioner for Patents of the United States Patent and Trademark Office*